3,213,118
NOVEL 4-HALO-Δ²-, 2-HALO-Δ⁴-, AND 2-HALO-Δ³-ANDROSTENE DERIVATIVES
Alexander D. Cross and Albert Bowers, Mexico City, Mexico, assignors to Syntex Corporation, Panama, Panama, a corporation of Panama
No Drawing. Filed July 9, 1962, Ser. No. 208,604
19 Claims. (Cl. 260—397.5)

The present invention relates to novel cyclopentanophenanthrene derivatives and to a process for the production thereof.

More particularly the present invention relates to novel 4-halo-Δ², 2-halo-Δ⁴, 2-halo-Δ³ and Δ¹,³ derivatives of the androstane series.

The novel compounds of the present invention are represented by the following formulae:

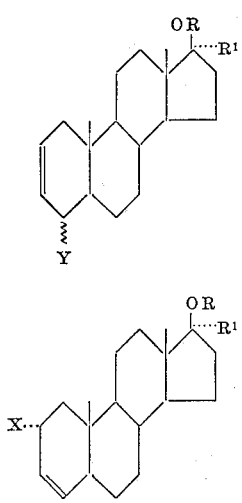

In the above formulae R represents hydrogen or a hydrocarbon carboxylic acyl group of less than 12 carbon atoms, R¹ represents hydrogen, a lower alkyl group, a lower alkenyl group or a lower alkinyl group; Y represents α-chlorine, β-chlorine or β-fluorine; and X represents fluorine or chlorine.

The acyl group referred to above is derived from hydrocarbon carboxylic acids containing less than 12 carbon atoms, which may be saturated or unsaturated, of straight, branched, cyclic or cyclicaliphatic chain, or aromatic, and may be substituted by functional groups such as hydroxy, alkoxy containing up to 5 carbon atoms, acyloxy containing up to 12 carbon atoms, nitro groups and amino groups or halogen atoms. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulae are potent anabolic agents with low androgenicity and they exhibit anti-estrogenic and anti-gonadotrophic activities. Furthermore, they lower the cholesterol level in the blood serum and adrenal glands.

The novel compounds of the present invention are prepared in accordance with the following formula scheme:

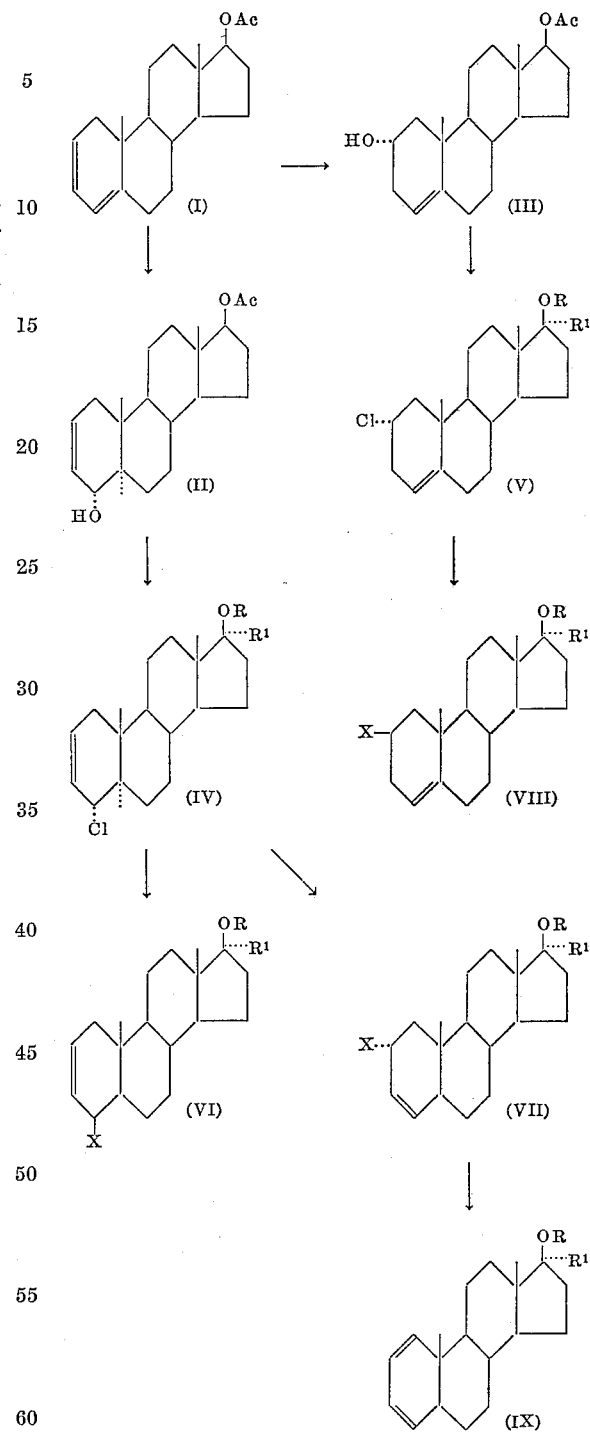

In the above formulae R, R¹ and X have the same meaning as hereinbefore set forth and Ac represents the acetyl group.

The starting compound (I) of the process outlined above, which $\Delta^{2,4}$-androstadien-17$\beta$-ol acetate, is prepared in accordance with the copending application of Bowers et al. U.S. patent application Serial No. 174,680 filed February 21, 1962, now U.S. Patent No. 3,082,220, by dibromination of the acetate of androstan-17$\beta$-ol-3-one, treatment of the thus-produced 2,4-dibromo-3-keto derivative with sodium iodide in acetone solution, reduction of the thus-obtained 2-iodo-testosterone acetate with a double metal hydride to give the 2-iodo-$\Delta^4$-androstene-3$\beta$,17$\beta$-diol-17-acetate, and finally, treatmenet of this compound with a zinc-copper couple in acetic acid.

In practicing the process outlined above, said starting compound (I) is treated with an excess of diborane in tetrahydrofuran solution and the resulting compound is reacted with hydrogen peroxide for a period of time of the order of two hours. Chromatography of the resulting products affords $\Delta^2$-androstene-4$\alpha$,17$\beta$-diol-17-acetate (II) and $\Delta^4$-androstene-2$\alpha$,17$\beta$-diol-17-acetate (III). These two compounds upon respective treatment with thionyl chloride in an ether solution, at approximately 0° C. for a period time of about 6 minutes, yield correspondingly the acetate of 4$\alpha$-chloro-$\Delta^2$-androsten-17$\beta$-ol (IV: R=acetyl; R$^1$=H) and 2$\alpha$-chloro-$\Delta^4$-androsten-17$\beta$-ol acetate (V: R=acetyl; R$^1$=H). Upon treatment of the acetate of 4$\alpha$-chloro-$\Delta^2$-androsten-17$\beta$-ol with an alkali metal fluoride or chloride, such as potassium fluoride or chloride in an inert solvent such as acetonitrile, there are obtained, after chromatographic separation, the corresponding 4$\beta$-halo-$\Delta^2$-androsten-17$\beta$-ol acetate (VI: R=acetyl; R$^1$=H) and 2$\alpha$-halo-$\Delta^3$-androsten-17$\beta$-ol acetate (VII: R=acetyl; R$^1$=H). Treatment of the latter 2-halo-$\Delta^3$-derivatives (VII) with an alkali metal hydride, such as sodium hydride in an inert solvent, preferably toluene, at reflux temperature, yields the acetate of $\Delta^{1,3}$-androstadien-17$\beta$-ol (IX: R=acetyl; R$^1$=H).

Upon treatment of the acetate of 2$\alpha$-chloro-$\Delta^4$-androsten-17$\beta$-ol with an alkali metal fluoride or chloride, such as potassium chloride or fluoride, in an inert solvent such as acetonitrile, there are obtained the corresponding 2$\beta$-halo-$\Delta^4$-androsten-17$\beta$-ol acetate derivatives (VIII: R=acetyl; R$^1$=H)

Upon conventional saponification of the 17$\beta$-acetoxy-17$\alpha$-unsubstituted compounds of the present invention (IV, V, VI, VII, VIII, IX: R=acetyl, R$^1$=H), in a basic medium, there are obtained the corresponding free 17$\beta$-alcohols (R=R$^1$=H) which are oxidized, preferably with chromic trioxide in pyridine to the corresponding 17-ketones. These ketones, upon treatment with a lower alkyl magnesium halide, such as methyl magnesium bromide, yield the corresponding 17$\alpha$-lower alkyl-17$\beta$-alcohols (IV, V, VI, VII, VIII, IX: R=H; R$^1$=lower alkyl). The aforesaid 17-ketones, upon treatment with a lower alkyne, such as acetylene, in t-amyl alcohol and in the presence of potassium t-amyl oxide, afford the corresponding 17$\alpha$-lower alkinyl-17$\beta$-ol derivatives (IV, V, VI, VII, VIII, IX: R=H; R$^1$=lower alkinyl)

which are thereafter hydrogenated with approximately 1 molar equivalent of hydrogen, in the presence of a suitable catalyst, such as prehydrogenated 2% palladium-calcium carbonate, to give the corresponding 17$\alpha$-lower alkenyl-17$\beta$-ol derivatives (IV, V, VI, VII, VIII, IX: R=H; R$^1$=lower alkenyl)

The novel compounds of the present invention having a secondary hydroxyl group, namely the 17$\alpha$-unsubstituted-17$\beta$-alcohols, are conventionally esterified in pyridine with an acetylating agent, such as an anhydride or a chloride of a hydrocarbon carboxylic acid of the type defined hereinbefore, thus affording the corresponding 17$\alpha$-unsubstituted-17$\beta$-acyloxy derivatives.

The 17$\alpha$-substituted-17$\beta$-ol derivative of the present invention are conventionally acylated in the presence of p-toluenesulfonic acid with an acylating agent such as acetic anhydride, caproic anhydride and the like, to give the corresponding 17$\beta$-esters.

The following specific examples serve to illustrate but are not intended to limit the scope of the present invention:

*Example I*

A slow stream of diborane was passed through a solution of 1 g. of $\Delta^{2,4}$-androstadien-17$\beta$-ol acetate in 125 cc. of tetrahydrofuran for 1 hour. (After 20 minutes the solution became warm and then the temperature slowly subsided.) The excess of diborane was decomposed by careful addition of water. Then 1 lt. of water was added and the formed precipitate was filtered, washed and dried, thus giving 9.6 g. of the organoboron compound.

This material was dissolved in 200 cc. of tetrahydrofuran and treated with 45 cc. of 35% hydrogen peroxide, stirring and keeping the temperature around 15° C. The mixture was stirred for 2 hours, after this time, the precipitated product was filtered, washed and dried, thus producing a residue which upon chromatography on 40 g. of alumina afforded $\Delta^2$-androstene-4$\alpha$,17$\beta$-diol 17-acetate and $\Delta^4$-androstene-2$\alpha$,17$\beta$-diol 17-acetate.

*Example II*

A solution of 1 g. of $\Delta^2$-androstene-4$\alpha$,17$\beta$-diol 17-acetate in 50 cc. of anhydrous ether was treated with 1.5 cc. of purified thionyl chloride at 0° C. The reaction mixture was allowed to stand at the same temperature for 6 minutes, then it was washed with aqueous sodium bicarbonate solution, water, dried over anhydrous sodium sulfate and evaporated to dryness. Crystallization of the solid residue from ether-ethyl acetate yielded 4$\alpha$-chloro-$\Delta^2$-androsten-17$\beta$-ol acetate.

Upon treatment of $\Delta^4$-androstene-2$\alpha$,17$\beta$-diol 17-acetate by the above procedure, there was obtained 2$\alpha$-chloro-$\Delta^4$-androsten-17$\beta$-ol acetate.

*Example III*

A mixture of 1 g. of 4$\alpha$-chloro-$\Delta^2$-androsten-17$\beta$-ol acetate, 2 g. of potassium chloride and 30 cc. of acetonitrile, was refluxed for 24 hours. It was then filtered and the filtrate was evaporated to dryness. The resulting residue was chromatographed on 40 g. of alumina, thus yielding 4$\beta$-chloro-$\Delta^2$-androsten-17$\beta$-ol acetate and 2$\alpha$-chloro-$\Delta^3$-androsten-17$\beta$-ol acetate.

*Example IV*

The procedure described in Example III was repeated, except that potassium chloride was substituted by potassium fluoride thus affording 4$\beta$-fluoro-$\Delta^2$-androsten-17$\beta$-ol acetate and 2$\alpha$-fluoro-$\Delta^3$-androsten-17$\beta$-ol acetate.

*Example V*

2$\alpha$-chloro-$\Delta^4$-androsten-17$\beta$-ol acetate was treated in accordance with Example III, thus yielding 2$\beta$-chloro-$\Delta^4$-androsten-17$\beta$-ol acetate.

*Example VI*

2$\alpha$-chloro-$\Delta^4$-androsten-17$\beta$-ol acetate was treated according to Example IV thus affording 2$\beta$-fluoro-$\Delta^4$-androsten-17$\beta$-ol acetate.

*Example VII*

A mixture of 1 g. of 2$\alpha$-chloro-$\Delta^3$-androsten-17$\beta$-ol acetate, 1 g. of sodium hydride and 50 cc. of dry toluene, was refluxed for 5 hours. The excess of the hydride was thereafter cautiously decomposed with t-butanol. The mixture was then filtered, washed with water, the organic layer was dried and evaporated to dryness. Crystallization from acetone-hexane yielded $\Delta^{1,3}$-androstadien-17$\beta$-ol acetate.

*Example VIII*

A suspension of 1 g. of 4$\alpha$-chloro-$\Delta^2$-androsten-17$\beta$-ol acetate in 60 cc. of methanol was treated with a solution of 1 g. of potassium carbonate in 60 cc. of water; the mixture was boiled under reflux for 1 hour and then cooled in ice and diluted with water. The formed precipitate was collected and recrystallized from acetone-hexane to yield 4α-chloro-Δ²-androsten-17β-ol.

Following the same procedure, there were treated the starting compounds listed under I, thus affording the corresponding products set forth under II.

| I | II |
|---|---|
| 2α-chloro-Δ⁴-androsten-17β-ol acetate | 2α-chloro-Δ⁴-androsten-17β-ol. |
| 4β-chloro-Δ²-androsten-17β-ol acetate | 4β-chloro-Δ²-androsten-17β-ol. |
| 2α-chloro-Δ³-androsten-17β-ol acetate | 2α-chloro-Δ³-androsten-17β-ol. |
| 4β-fluoro-Δ²-androsten-17β-ol acetate | 4β-fluoro-Δ²-androsten-17β-ol. |
| 2α-fluoro-Δ³-androsten-17β-ol acetate | 2α-fluoro-Δ³-androsten-17β-ol. |
| 2β-chloro-Δ⁴-androsten-17β-ol acetate | 2β-chloro-Δ⁴-androsten-17β-ol. |
| 2β-fluoro-Δ⁴-androsten-17β-ol acetate | 2β-fluoro-Δ⁴-androsten-17β-ol. |
| Δ¹,³-androstadien-17β-ol acetate | Δ¹,³-androstadien-17β-ol. |

Example IX

A solution of 6 g. of 4α-chloro-Δ²-androsten-17β-ol in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 4α-chloro-²-androsten-17-one.

The rest of the compounds produced in Example VIII were treated by the same procedure, thus yielding respectively: 2α-chloro-Δ⁴-androsten-17-one, 4β-chloro-Δ²-androsten-17-one, 2α-chloro-Δ³-androsten-17-one, 4β-fluoro-Δ² - androsten-17-one, 2α-fluoro-Δ³ - androsten-17-one, 2β-chloro-Δ⁴-androsten-17-one, 2β-fluoro-Δ⁴-androsten-17-one, Δ¹,³-androstadien-17-one.

Example X

A solution of 5 g. of 4α-chloro-Δ²-androsten-17-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product was isolated by ethyl acetate extraction. The extract was washed with water, dried over anhydrous sodium sulfate and evaporated to dryness.

Recrystallization from methylene chloride-hexane afforded 17α-methyl-4α-chloro-Δ²-androsten-17β-ol.

The rest of the final compounds set forth in Example IX were treated by the same procedure thus yielding respectively: 17α-methyl-2α - chloro-Δ⁴ - androsten-17β-ol, 17α-methyl-4β - chloro-Δ² - androsten-17β-ol, 17α-methyl-2α-chloro-Δ³ - androsten-17β-ol, 17α-methyl-4β-fluoro-Δ²-androsten-17β-ol, 17α-methyl-2α-fluoro-Δ³-androsten-17β-ol, 17α-methyl-2β-chloro-Δ⁴-androsten-17β-ol, 17α-methyl-2β-fluoro-Δ⁴-androsten-17β-ol, 17α-methyl-Δ¹,³-androstadien-17β-ol.

Example XI

A solution of 1 g. of 4α-chloro-Δ²-androsten-17-one in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded 17α-ethinyl-4α-chloro-Δ²-androsten-17β-ol.

The rest of the final compounds disclosed in Example IX were treated by the above method, to give respectively: 17α-ethinyl-2α-chloro-Δ⁴-androsten-17β-ol, 17α-ethinyl-4β-chloro-Δ2-androsten-17β-ol, 17α-ethinyl-2α-chloro-Δ³-androsten-17β-ol, 17α-ethinyl-4β-fluoro - Δ²-androsten-17β-ol, 17α-ethinyl-2α-fluoro - Δ³-androsten-17β-ol, 17α-ethinyl-2β - chloro-Δ⁴ - androsten-17β-ol, 17α-ethinyl-2β-fluoro-Δ⁴-androsten-17β-ol, 17α-ethinyl-Δ¹,³-androstadien-17β-ol.

Example XII

A solution of 1 g. of 17α-ethinyl-4α-chloro-Δ²-androsten-17β-ol in 40 cc. of pyridine was hydrogenated at 25° C. and 570 mm. in the presence of 400 mg. of prehydrogenated 2% palladium calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 17α-vinyl-4α-chloro-Δ²-androsten-17β-ol. The rest of the final compounds described in Example XI were treated following the above procedure, thus giving: 17α-vinyl - 2α-chloro-Δ⁴ - androsten-17β-ol, 17α-vinyl-4β-chloro-Δ²-androsten-17β-ol, 17α-vinyl-2α-chloro-Δ³-androsten-17β-ol, 17α-vinyl-4β-fluoro-Δ²-androsten-17β-ol, 17α-vinyl-2α-fluoro-Δ³-androsten-17β-ol, 17α-vinyl-2β-chloro-Δ⁴-androsten-17β-ol, 17α-vinyl-2β - fluoro-Δ⁴ - androsten-17β-ol, 17α-vinyl-Δ¹,³-androstadien-17β-ol.

Example XIII

A mixture of 1 g. of 4α-chloro-Δ²-androsten-17β-ol, 4 cc. of pyridine and 2 cc. of propionic anhydride was kept at room temperature overnight, poured into ice water, the formed precipitate was filtered, washed with water and dried. Crystallization from acetone-hexane gave 4α-chloro-Δ²-androsten-17β-ol propionate.

Example XIV

To a solution of 5 g. of 17α-methyl-4α-chloro-Δ²-androsten-17β-ol (obtained according to Example X) in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α-methyl-4α-chloro-Δ²-androsten-17β-ol caproate. The rest of the compounds obtained in accordance with Example X were treated by the same procedure, yielding respectively: 17α-methyl-2α-chloro - Δ⁴-androsten-17β-ol caproate, 17α-methyl-4β-chloro-Δ² - androsten - 17β-ol caproate, 17α-methyl - 2α-chloro-Δ³-androsten-17β-ol caproate, 17α-methyl-4β-fluoro-Δ²-androsten-17β-ol caproate, 17α-methyl-2α-fluoro-Δ³-androsten-17β-ol caproate, 17α-methyl-2β - chloro-Δ⁴-androsten-17β-ol caproate, 17α-methyl-2β - fluoro-Δ⁴-androsten-17β-ol caproate, 17α-methyl-Δ¹,³ - androstadien-17β-ol caproate.

Example XV

In accordance with Example XIV, there were produced the following products, from the corresponding free alcohols: 17α-ethinyl-2α-chloro-Δ⁴-androsten-17β-ol caproate, 17α-ethinyl-4β-chloro-Δ²-androsten-17β-ol caproate, 17α-ethinyl-2α-chloro-Δ³-androsten-17β-ol caproate, 17α-ethinyl-4β-fluoro-Δ²-androsten-17β-ol caproate, 17α-vinyl-2α-fluoro-Δ³-androsten-17β-ol caproate, 17α-vinyl-2β-chloro-Δ⁴-androsten-17β-ol caproate, 17α-vinyl-2β-fluoro-Δ⁴-androsten-17β-ol caproate, 17α-vinyl-Δ¹,³-androstadien-17β-ol caproate.

We claim:
1. A compound of the following formula:

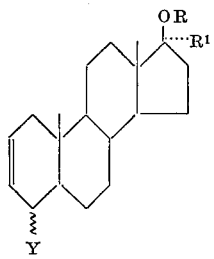

wherein Y is selected from the group consisting of α-chlorine, β-chlorine and β-fluorine; R is a member of the group consisting of hydrogen and a hydrocarbon carboxylic acyl group of less than 12 carbon atoms; and R¹ is selected from the group consisting of hydrogen, a lower alkyl group, a lower alkenyl group and a lower alkinyl group.
2. 4β-chloro-Δ²-androsten-17β-ol.
3. 4β-fluoro-Δ²-androsten-17β-ol.
4. 4α-chloro-Δ²-androsten-17β-ol.
5. 17α-mthyl-4α-chloro-Δ²-androsten-17β-ol.
6. 17α-methyl-4β-chloro-Δ²-androsten-17β-ol.
7. 17α-methyl-4β-fluoro-Δ²-androsten-17β-ol.
8. A compound of the following formula:

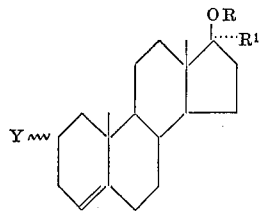

wherein Y is selected from the group consisting of α-chlorine, β-chlorine, and β-fluorine; R is a member of the group consisting of hydrogen and a hydrocarbon carboxylic acyl group of less than 12 carbon atoms; and R¹ is selected from the group consisting of hydrogen, a lower alkyl group, a lower alkenyl group and a lower alkinyl group.
9. 2α-chloro-Δ⁴-androsten-17β-ol.
10. 2β-chloro-Δ⁴-androsten-17β-ol.
11. 2β-fluoro-Δ⁴-androsten-17β-ol.
12. 17α-methyl-2α-chloro-Δ⁴-androsten-17β-ol.
13. 17α-methyl-2β-chloro-Δ⁴-androsten-17β-ol.
14 17α-methyl-2β-fluoro-Δ⁴-androsten-17β-ol.
15. A compound of the following formula:

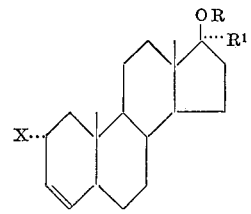

wherein X is selected from the group consisting of fluorine and chlorine; R is a member of the group consisting of hydrogen and a hydrocarbon carboxylic acyl group of less than 12 carbon atoms and R¹ is selected from the group consisting of hydrogen, a lower alkyl group, a lower alkenyl group and a lower alkinyl group.
16. 2α-chloro-Δ³-androsten-17β-ol.
17. 2α-fluoro-Δ³-androsten-17β-ol.
18. 17α-methyl-2α-chloro-Δ³-androsten-17β-ol.
19. 17α-methyl-2α-fluoro-Δ³-androsten-17β-ol.

References Cited by the Examiner
UNITED STATES PATENTS

| | | | |
|---|---|---|---|
| 3,079,406 | 2/63 | Knox | 260—397.1 |
| 3,080,394 | 3/63 | Bowers et al. | 260—397.4 |

LEWIS GOTTS, *Primary Examiner.*